May 2, 1961 A. A. VARESE ET AL 2,982,247
SEALED DAIRY MILK TRANSFER TANK
Filed July 23, 1958 4 Sheets-Sheet 3

MILKING

TRANSFER

INVENTORS
Anthony A. Varese
Melvin F. Roberts
BY
Byron, Hume, Groen & Clement
Attys.

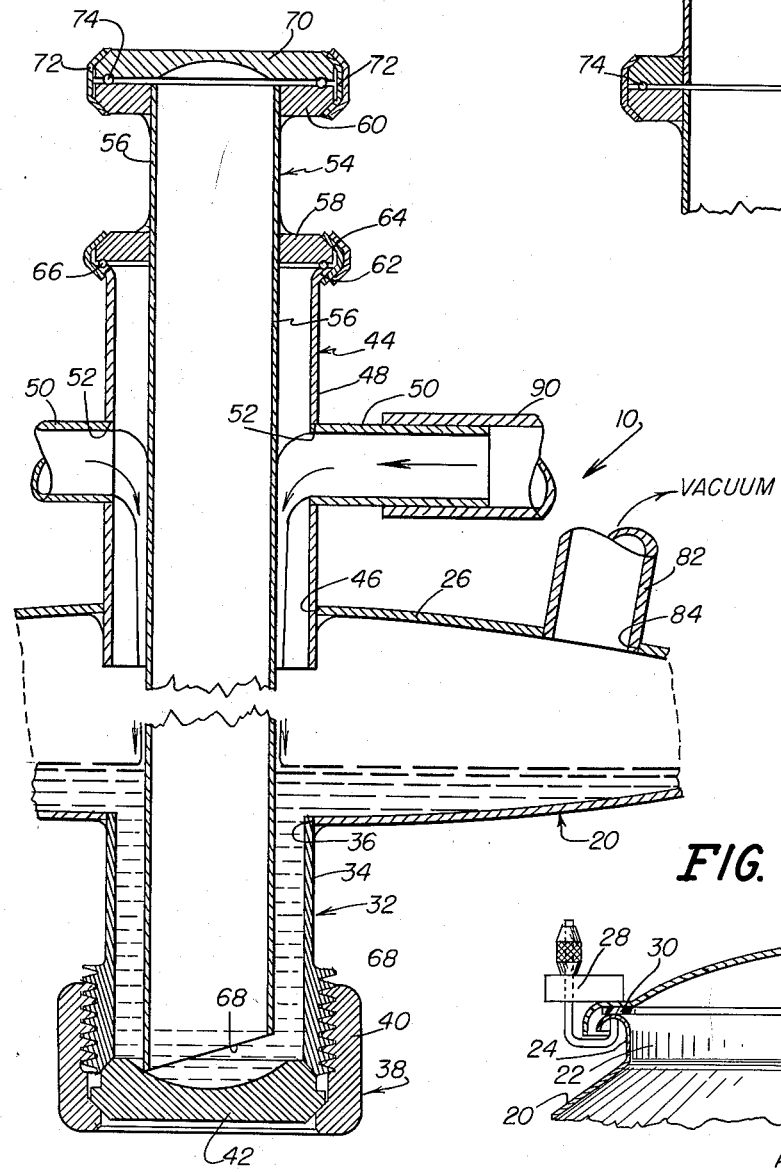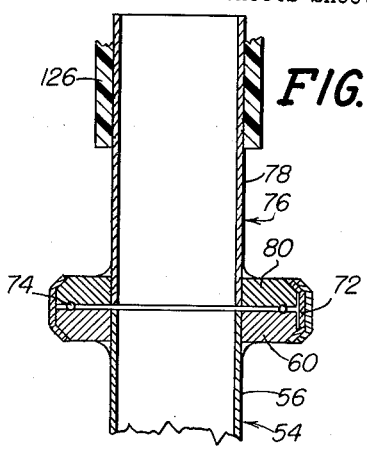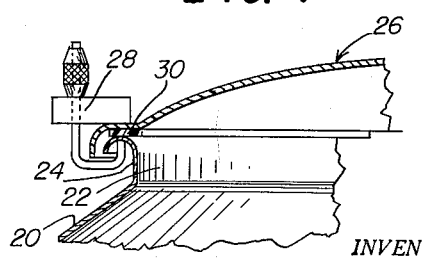
INVENTORS
Anthony A. Varese
Melvin F. Roberts

United States Patent Office 2,982,247
Patented May 2, 1961

2,982,247

SEALED DAIRY MILK TRANSFER TANK

Anthony A. Varese, McHenry, and Melvin F. Roberts, Niles, Ill., assignors to Craft Manufacturing Company, North Chicago, Ill., a corporation of Illinois Filed July 23, 1958, Ser. No. 750,442

5 Claims. (Cl. 119—14.11)

This invention relates to a method and apparatus for sealed, sanitary transfer of milk from dairy cows to a milk storage tank or bulk milk cooler. More particularly, the invention relates to a dairy milk transfer device embodying a portable sealed container coacting with sanitary milking apparatus and sanitary milk pumping apparatus for accomplishing completely sealed transfer of milk from dairy cows to a milk storage tank.

One of the major problems encountered in modern dairy farming involves the transfer of milk from dairy cows to a milk storage tank. A few years ago all of the operations involved in this process were performed by hand in a series of steps: first, hand milking of each individual cow into an open bucket; second, transporting the open bucket to the milk storage tank; and, third, open pouring of the milk from the bucket into the tank. Obviously, this completely manual process was inefficient and seriously limited the number of cows which could be handled by one man. Even more important, the manual process was completely undesirable from a sanitation standpoint because the open handling and transfer of the milk subjected it to contamination from dirt, flies, bacteria in the air, and the like.

In recent years the milking process itself has been considerably improved through the widespread adoption of milking machines. Such machines ordinarily include teat cups for attaching to the cow's udder, having pressure or vacuum actuated means for squeezing the teats and ejecting the milk, together with vacuum means for drawing away and collecting the ejected milk.

While the advent of modern milking machines has increased the speed and efficiency of milking and has substantially improved sanitation, such machines did not solve the problem of handling the collected milk until it was eventually deposited in the milk storage tank or bulk milk cooler tank. In the great majority of dairy farms, the subsequent handling has continued to be a manual, open transfer operation, in other words, the milk from the milking machine is dumped into a bucket or a standard milking can, and the can is carried to the milk shed and dumped into the milk storage tank. The milk is, thus, still subject to danger of contamination by reason of this open transfer. Furthermore, the operation is still quite inefficient, and one man still cannot milk more than about two cows at a time, even while using the best of modern milking machinery. Because the operation is slow and warm milk spoils rapidly, the farmer must carry the milk taken from each cow individually into the milk shed and pour it into the cooler. Furthermore, the frequent trips further slow the milking process.

For very large dairy farms having one hundred or more cows, the problem has been partially solved by employing what is generally referred to as a "pipe-line system" in which the milk coming from the milking machines is deposited directly into a sanitary pipe-line which leads directly to the milk cooler. However, this system is subject to a number of disadvantages.

One of the serious disadvantages of pipe-line systems and other systems for handling milk has been the rough handling to which the milk is subjected. This comes about by reason of passing the milk through vacuum releasers or pump impellers, or the like, rushing the milk through only partly filled conduits, and violently dumping the milk into the milk storage tank. This rough handling of the milk, generally referred to as "turbulation," causes foaming and aeration which increases bacteria action, leading to faster spoilage. In addition, the turbulation often breaks down the enzymes in the milk, thus reducing its taste qualities and further increasing bacteria action. Thus, it is highly desirable that the milk be handled gently, be passed through pipes which are completely filled, and not be passed through milk pumps having impellers or the like.

Pipe-line systems are further undesirable in that they are inefficient except when used with a very large number of cows. Also, the long lines are very difficult to clean and maintain in sanitary condition, and, consequently, sanitary inspectors have approved such systems with great reluctance and then only because there has been no other satisfactory alternative. Of course, such systems are very expensive and are not economically feasible for the great majority of dairy farms.

Most milk handling systems of the prior art have an additional disadvantage. When the milk is poured into a container in a manner causing it to splash against the walls of the container, the droplets of milk which are not connected with the main body in the container often dry and form hard specks referred to as "milk stone." When the container is subsequently filled sufficient to engulf these milk stones, they form nuclei for increased bacteria action leading to rapid spoilage.

In an effort to solve the serious milk transfer problem for the large majority of dairy farmers, for example, those keeping from 25 to 100 cows, various milk transfer systems have been devised, but with little success, as demonstrated by the fact that the great majority of dairy farmers still utilize manual, open transfer between the milking machines and the storage tank. Efforts of this type are characterized by Anderson Patent No. 2,287,506; Schmitt Patent No. 2,361,970; Frost Patent No. 2,350,602; Lowry Patent No. 2,516,328; and Taylor Patent No. 2,516,354. While these patents disclose devices for milking directly into tanks or containers which may be wheeled or otherwise transported to the milk shed, in every case the milk is transferred from the containers into the storage tank by open pouring so that the milk is subjected to contamination, aeration, turbulation and the like. Furthermore, the individual containers must be small or else they could not be lifted and poured into the storage tank.

The dairy transfer device according to the present invention provides for completely sealed transfer of milk from dairy cows to the milk storage tank without the use of a pipe-line system, so that the device of this invention is not subject to any of the disadvantages previously outlined. In addition, the invention provides a number of other important advantages for increasing efficiency and enhancing sanitation.

Accordingly, it is an object of the invention to provide a substantially improved method of transfer of dairy milk from the dairy cow to the milk storage tank.

Another object of the invention is to provide an improved dairy milk transfer device for completely sealed transfer of milk from dairy cows to a milk storage tank.

A further object of the invention is to provide a dairy milk transfer device which will permit one man to milk a substantially large number of cows within a given time.

Still another object of the invention is to provide a dairy milk transfer device embodying substantially improved milk pumping means.

A still further object of the invention is to provide an improved method for pumping liquid milk without necessitating the the use of vacuum releasers, pump impellers, or the like, in direct contact with the milk being pumped.

An additional object of the invention is to provide an improved dairy milk receiver device for eliminating splashing of milk received from milking machines.

Another object of the invention is to provide an improved dairy milk transfer device which eliminates aeration and turbulation of the milk.

A further object of the invention is to provide a dairy milk transfer device which can be easily cleaned and inspected.

Other objects, features and advantages will be apparent from the following detailed description, taken in conjunction with the accompanying drawings, in which:

Figure 5 is an enlarged, fragmentary sectional view of the transfer tank portion of the device of Figures 1 and 2, showing the device being used during the milking process;

Figure 6 is an enlarged, fragmentary sectional view showing a section of the device of Figure 5 as it is arranged when used in the transfer operation; and Figure 7 is an enlarged, fragmentary sectional view showing the means for clamping the cover on the transfer tank.

Figure 1:
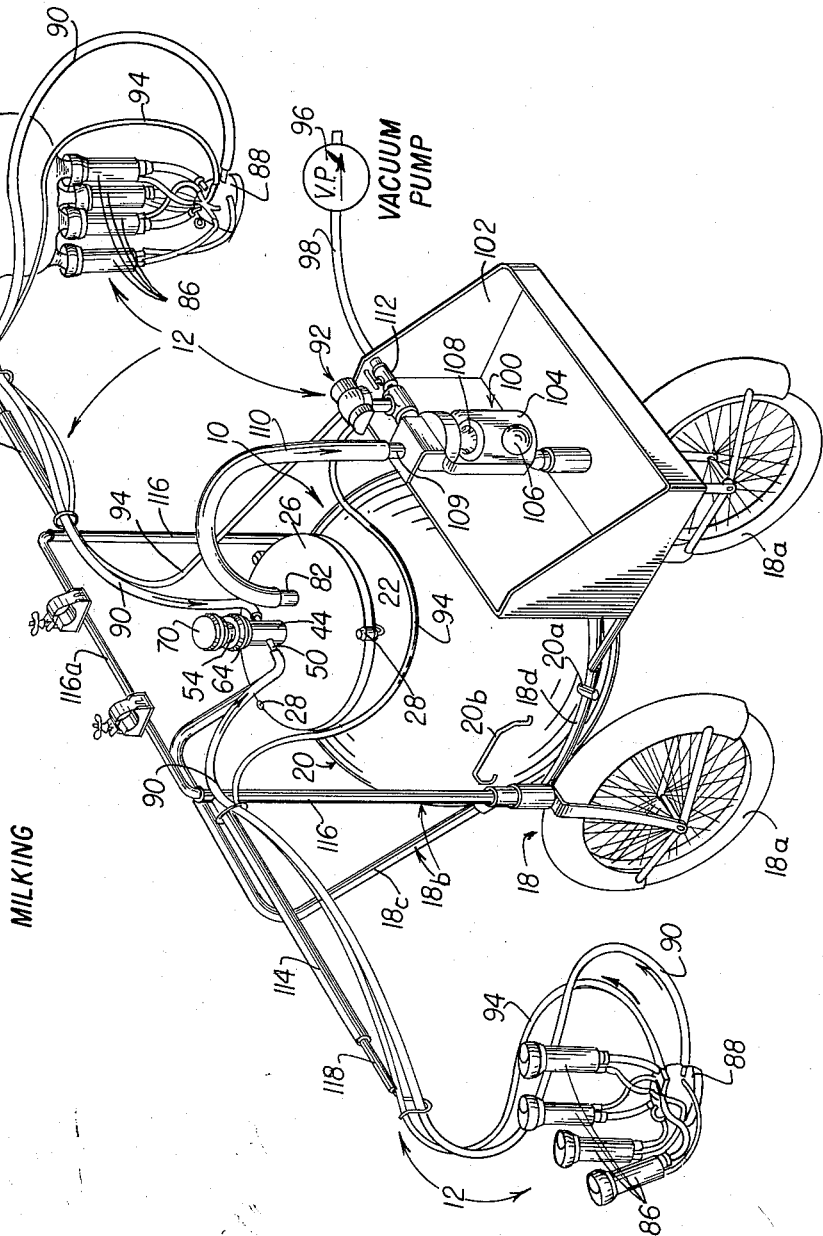
Figure 1 is a perspective view of a dairy milk transfer device according to the present invention, being utilized in the milking operation.

The dairy transfer device of the present invention includes, generally, a portable transfer tank 10, a plurality of milking machines 12 (Figs. 1 and 3) for taking milk from dairy cows and depositing it in the transfer tank, and milk pumping means (Figs. 2 and 4) for pumping the milk from the transfer tank into a milk storage tank or bulk milk cooler 16. The portable transfer tank 10 is adapted for being removably mounted on a wheeled cart 18.

The milk storage tank 16 is of any suitable construction for maintaining a large supply of milk in a sanitary condition and at a low temperature until the milk can be delivered to a dairy truck or the like (not shown) for transporting to the dairy. Typical milk storage tanks are shown in Pearson Patent No. 2,824,431, dated February 25, 1958, and Varese et al. Patent No. 2,824,432, dated February 25, 1958, both owned by the assignee of the present invention.

The transfer tank 10 has a spherical body portion 20 which is formed of a rigid, non-corrosive material, such as 16 gauge 18/8 stainless steel of smooth finish. The tank body 20 is provided with an enlarged upper opening 22, defined by an upstanding annular flange 24 (Fig. 7). A cover 26, formed of the same material as the tank body 20, is tightly clamped over the opening 22 by means of a plurality of removable clamps 28 of any suitable construction. A sealing gasket 30, of any suitable resilient sealing material, is disposed between the opposed portions of the flange 24 and the cover 26. When the cover 26 is in place and clamped, an air-tight seal is provided.

The cart 18 may be of any suitable construction for carrying the transfer tank 10. As shown, the cart includes three wheels 18a connected to a frame 18b. One or more of the wheels are castored in order to permit steering of the cart as it is pushed by means of a tubular handle 18c. The cart may include an annular tubular support ring 18d which has an inside diameter smaller than the outside diameter of the spherical tank body 20 so that the tank body can be rested on and supported by the support ring 18d, as shown. In order to insure that the transfer tank remains in an upright position, a plurality of seating lugs 20a (one shown) are welded to the tank body 20 and are properly arranged to engage the support ring 18d of the cart and to prevent any tilting of the tank while it is supported on the cart. For permitting removal of the tank from the cart a pair of carrying handles 20b may be provided (one shown).

Figure 3:
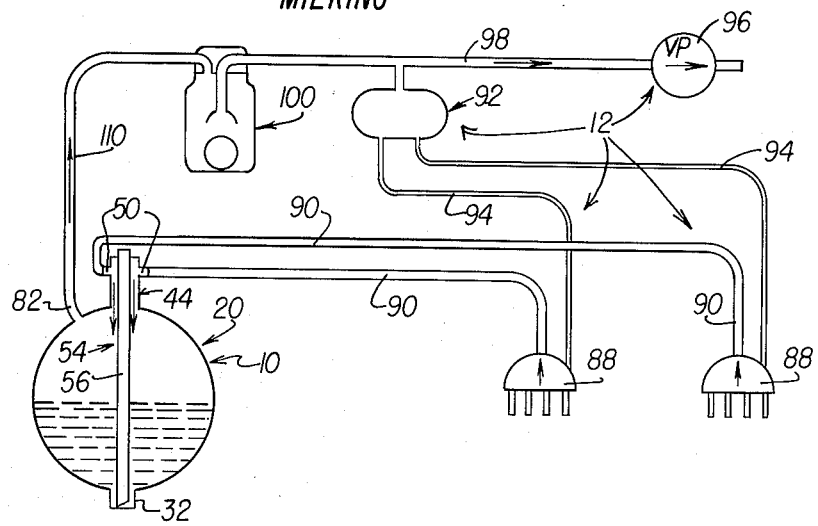
Figure 3 is a schematic illustration of the device being used in the milking process, as shown in Figure 1.
Figure 4:
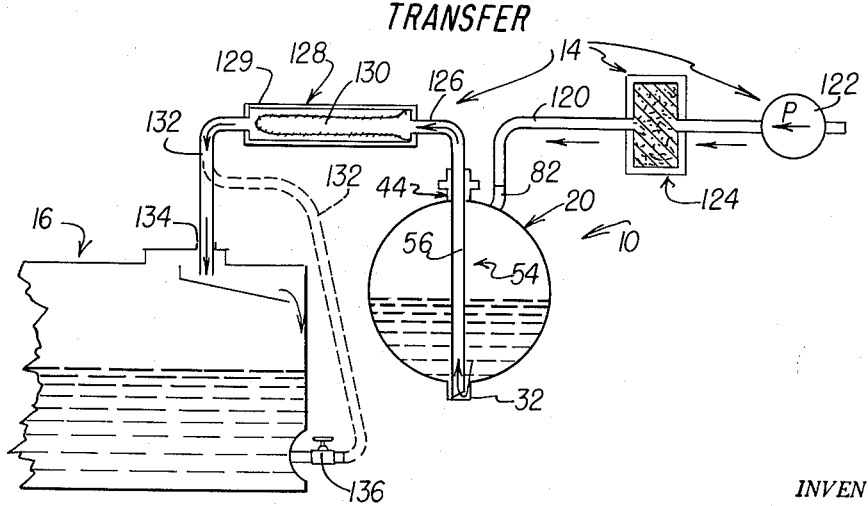
Figure 4 is a schematic illustration of the device being used in the transfer process, as shown in Figure 2.

At the bottom of the tank body 20 a sump 32 is formed (Figs. 3, 4 and 5). The sump includes a short pipe fitting 34 which is welded in place in a circular aperture 36 formed at the lowest point in the tank body. The upper margin of the pipe portion 34 is flush with the inner surface of the tank body as shown, and the lower portion is threaded for receiving a threaded, removable cap assembly 38. The cap assembly includes an internally threaded collar 40 which is adapted to clamp a plug 42 against the bottom end of the pipe fitting 34 in order to provide a water-tight seal. The pipe fitting 34 and the portions of the cap assembly 38 are preferably formed of a smooth, non-corrosive material, such as stainless steel. The sump 32 provides a drain to permit washing, and draining of the tank body 20 without tipping, and the sump also accomplishes another important purpose to be described later.

A milk inlet fitting 44 is welded in place in an aperture 46 formed in the center of the cover 26 directly above the sump 32 (Figs. 3, 4 and 5). The milk inlet fitting 44 has a vertically disposed tubular body 48, which is secured in the aperture 46, with a plurality of milk inlet pipes 50 welded at right angles thereto and secured in apertures 52 formed through the wall of the body portion 48. It is contemplated that as many as six or more of these milk inlets 50 can be provided, although only two are shown for convenience.

According to the present invention, a standpipe 54 is removably secured in the milk inlet fitting 44 and extends downwardly into the sump outlet 32. The standpipe 54 performs an important function in both the milking and transfer operations, to be described. It includes an elongated tubular body 56, which is of somewhat smaller diameter than the milk inlet body 48, and is provided with a pair of spaced annular securing flanges 58 and 60. The flange 60 is welded at the top of the standpipe body 56, and the flange 58 welded to the body at a slightly lower position as shown. The milk inlet fitting 44 is outwardly flared at its upper edge to provide an annular flange 62 coacting with the connecting flange 58 of the standpipe. A removable annular clamp 64, of any suitable construction, is clamped about the annular flange 62 and the securing flange 58 in order to secure the standpipe 54 in vertical annular spaced relation in the milk inlet fitting 44 as shown. An annular sealing ring 66 is disposed between the flanges 58 and 62 in order to provide an air-tight seal. The arrangement and sizes are such that the lower end portion of the standpipe body 56 extends in spaced relation into the sump 32 and the end touches or just clears the inner surface of the cap plug 42. The lower margin 68 of the standpipe is cut off at an angle, as shown, to provide a predetermined flow area from the tank into the standpipe.

When the milk transfer device is being used in the milking process as shown in Figures 1, 3 and 5, a sealing cap 70 is clamped over the upper end of the standpipe 54 and is held in place against the connecting flange 60 by means of a removable annular clamp member 72. An annular sealing ring 74 is disposed between the cap and the flange to provide an air-tight seal.

Figure 2:
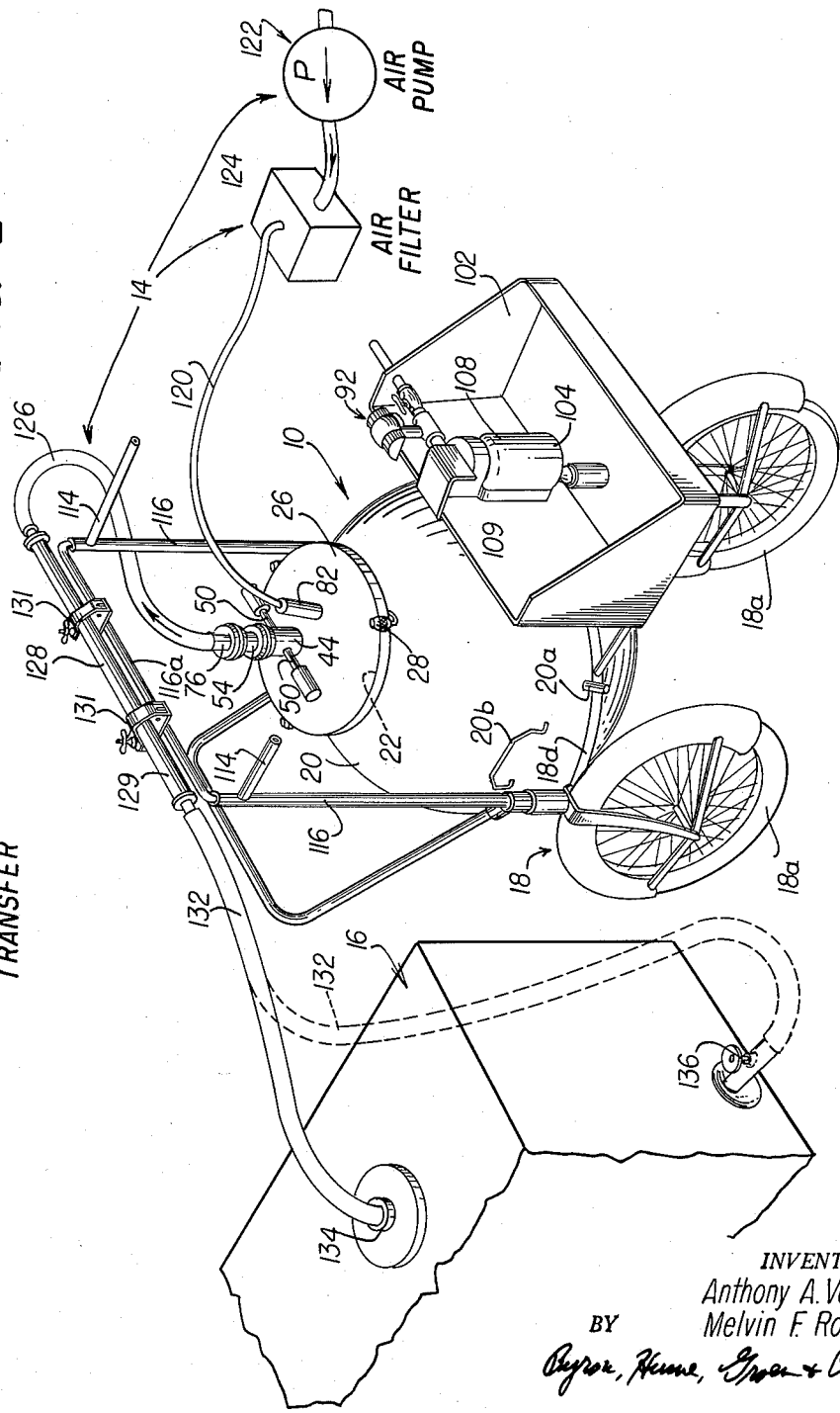
Figure 2 is a perspective view of a dairy milk transfer device according to Figure 1 being used in the transfer operation, during transfer of the milk from the transfer device into the milk storage tank.

When the milk transfer device is being used in the transfer process as shown in Figures 2, 4, and 6, the cap 70 is replaced by a hose fitting 76 which includes a short pipe portion 78 with an annular securing flange 80 welded at its lower end as shown. When the fitting 76 is clamped in place, by means of the clamp member 72, the standpipe provides a passage from the tank through the sump 32.

The standpipe 54 and related fittings are preferably formed of smooth stainless steel or the like.

An air hose fitting 82 is formed in the cover 26 in the form of an upstanding tubular member which is welded in place in an aperture 84.

The dairy cow milking apparatus or machines 12 are provided for taking milk from a plurality of dairy cows and pouring the milk into the transfer tank 20 through the milk inlets 50. The milking machines may be of any suitable type such as the "Surge" milker produced by Babson Brothers, or the "Perfection" milker produced by Perfection Mfg. Corp., or the "Universal" milker produced by Universal Milking Machine Co. or any other suitable milker. The particular milking machines shown are of the vacuum actuated type and each includes four teat cups 86 connected to a manifold pot 88. A milk discharge connection of the manifold pot 88 is connected to a milk conduit 90 which, in turn, is connected to one of the milk inlets 50 of the fitting 44. A vaccum pulsator device 92, of any suitable construction, is connected to the teat cups 86 by means of a pulsator line 94. As many pulsator devices may be provided as are necessary to pulsate the teat cups of the milking machines utilized. In the present instance only two milking machines are shown so that a single pulsator will suffice.

A suitable source of vacuum is provided in order to actuate the milking machines 12. In the present instance the source comprises a vacuum pump 96, of any suitable construction, which is connected by means of a vacuum conduit 98 to a moisture trap 100. The moisture trap 100 may be of any suitable type for preventing passage of moisture and is mounted on a tray portion 102 of the cart 18. The particular moisture trap shown includes a glass container 104 containing a ball valve 106. If the container 104 begins to fill with liquid, the ball valve 106 is carried upwardly until it is sucked into seating position against a vacuum valve seat 108 connected to the vacuum line 98, thereby sealing the line and cutting off the vacuum. The vacuum pulsator 92 is also connected to the vacuum line 98 just ahead of the moisture trap 100, and, consequently, the moisture trap prevents moisture from entering the pulsator and also prevents moisture from passing down the vacuum line 98 to the vacuum pump 96. The moisture trap 100 is provided with an additional outlet 109 which is connected by means of a conduit 110 with the air connection pipe 82 of the transfer tank 10.

Thus, when the vacuum pump 96 is operated, with the sealing cap 70 clamped in place over the end of the standpipe 54 and the milking machines connected, the inside of the transfer tank 110 is evacuated and at the same time the pulsator 92 is subjected to vacuum pressure.

A vacuum shut-off valve 112 is connected in the vacuum line 98 before the pulsator 92 in order to permit control of the vacuum while the operator is standing next to the transfer tank.

The milking machines 12 are provided with valve cut-off means (not shown) which seal off the milk conduit 90 when the particular machine is not in use, so that the transfer tank 10 is maintained in sealed condition. If desired, any suitable valve means (not shown) can be connected to or formed in the milk inlets 50 in order to shut off the milk inlets and seal the tank, so that the milking machines can be removed when not in use, if desired. In either event, the transfer tank 10 is maintained in sealed, sanitary condition when the milking machines are not in operation, so that the transfer tank can be wheeled about on the cart without danger of contamination.

If desired, means may be provided for supporting the conduits 90 and 94 on the cart 18, as well as the teat cups 86 and the manifold pots 88, if desired, when the milking machines are not in use. Such a support structure may be in the form of a plurality of arms 114, one for each milking machine, carried on vertical tubular support members 116 connected to the frame 18d of the cart. The arms may be swivelly connected as shown so that they can be extended to the side while the milking is in process, as shown in Figure 1, or can be swung inwardly to a stored position during the transfer process when the milking machines are not in use, as shown in Figure 2. The arms may also be provided with telescoped extension portions 118 in order to increase the supporting reach of the arms 114.

The spherical configuration of the transfer tank 10 is important for a number of reasons. First, it is the most efficient form for containing a vacuum and permits construction of lighter material than would otherwise be possible. In addition, it is very easy to clean and maintain in a sanitary condition because it has no corners or folds and all portions of the tank body can be seen, including the bottom, without removing the tank from the cart 18. A further important advantage of the spherical shape is that the tank can be readily drained completely during the transfer operation, to be described.

When the transfer tank is used in the transfer operation (Figs. 2 and 4) as distinguished from the milking operation, the vacuum line 110 is disconnected and the air connecting fitting 82 is connected to a source of pressurized, filtered air by means of an air pressure conduit 120. The source of filtered air under pressure may comprise an air pump 122, of any suitable construction, for providing a predetermined air pressure and for delivering the air, under pressure, to an air filter, of any suitable type, for filtering and cleaning the air. The filtered air from the air filter 124 is delivered to the air pressure conduit 120. Consequently, when the pump 122 is actuated, the inside of the transfer tank 10 may be pressurized with clean, filtered air.

For the milk transfer operation the sealing cap 70 is replaced by the standpipe fitting 76 which is connected to a milk outlet conduit 126. The conduit 126 is preferably formed of flexible clear plastic material which is chemically inert with respect to fluid milk. At its other end the milk outlet conduit 126 is connected to any suitable type of milk filter 128. The particular milk filter shown is of the "bag type" with an elongated tube-like body 129 containing a filter bag 130 therein, illustrated schematically in Figure 4. The filter 128 is supported on the cart 18 by means of a cross bar portion 116a which connects the upright frame members 116 at their upper ends. The filter is removably held thereon by means of a pair of quick disconnect clamps 131 of any suitable construction.

The filtered milk delivered at the outlet end of the filter 128 is carried by means of a flexible plastic conduit 132 to the milk storage tank 16. The milk delivered through the conduit 132 may enter the milk storage tank 16 at the filler opening 134 at the top, or, if desired, the conduit may be directed as shown in dotted lines to the tank drain cock 136 at the bottom of the storage tank.

It is contemplated that the hose fitting 76, the conduits 126 and 132, and the filter 128 will be kept in the milk shed adjacent the milk storage tank 16. If desired, for convenience, the filter 128 may be supported on the milk storage tank 16 or adjacent thereto instead of being supported on the cart frame member 116a as shown.

Of course, it will be understood that any suitable type of milk filter may be used in place of the milk filter 128 and, if desired, the filter could be connected directly to the selected filler port of the milk storage tank.

*Operation*

When the milk transfer device is to be used for milking, the parts are set up as shown in Figures 1, 3 and 5. The teat cups 86 of the various milking machines are connected to the udders of the dairy cows to be milked, and the vacuum created by the vacuum pump 96 causes the milk to be drawn from the teats by alternate squeezing action and suction action which is well known in the art. The milk taken from the cows is delivered through the milk delivery conduits 90 to the milk inlet pipes 50 of the standpipe fitting 44. The milk is thus discharged in towards the center of the fitting 44 against the standpipe 54. Here the milk forms a relatively even sheath about the standpipe as it flows downwardly into the tank body 20, so that the milk is delivered to the supply of milk in the tank without any splashing or agitation. Thus, during the milking operation the standpipe prevents turbulation and also prevents formation of droplets on the unwetted walls of the tank which might form milk stone.

When the milking of one cow is completed, the teat cups are removed and attached to the udder of the next cow. The cart 18 carrying the transfer tank 10 is wheeled when and where necessary in order to reach the cows being milked. Because the dairy farmer handling the milk transfer device of this invention need not periodically carry filled milk cans from the milking barn to the milk shed, the milking process can be continued without pause until the transfer tank 10 is filled. The only operation which need be performed, once the milking has begun, is the transfer of the teat cups from cow to cow and the moving of the cart where necessary. Consequently, the farmer can simultaneously milk as many as six cows at one time, whereas in the bucket milking method utilized by the great majority of farmers, only about two cows can be milked at the same time. Since the transfer of the milk from the cows to the transfer tank 10 is completely sealed, there is no danger of contamination.

After sufficient cows have been milked to fill the tank 10, the vacuum source is shut off and the milking machines are disconnected. If the milking machines are to be left hanging on the cart, then the valves in the machines (not shown) are closed so that the transfer tank is completely sealed. The vacuum line is also closed in any suitable manner, such as by turning off the shut-off valve 12. If the milking machines are to be removed from the cart and left in the milking barn, valve means (not shown) associated with the standpipe fitting 44 and milk inlets 50 are shut off to seal the transfer tank, and the milking machines are then removed by disconnecting the conduits 90 and 94 from the standpipe fitting 44 and the pulsator 92, respectively.

With the transfer tank 10 filled and sealed the cart 18 carrying the tank is then wheeled to the milk shed (not shown) adjacent the milk storage tank 16 (Figs. 2 and 4. The cap 70 is then removed from the top of the standpipe 54 and the connecting fitting 76 is connected to the standpipe, as illustrated in Figure 6. This provides a milk channel from the tank 10 through the standpipe 56, the conduit 126, the filter 128, and the conduit 132 to the milk storage tank 16. If the connection is made at the drain cock 136, then the valve is kept closed until the connection is secure.

After the proper connections have been made, the air pressure pump 122 is started and delivers filtered air through the conduit 120 into the tank 20. This provides an air pressure greater than atmospheric acting on the surface of the milk in the tank and consequently the milk rises in the standpipe 56 and flows through the conduit 126, the filter 128 and the conduit 132 into the milk storage tank 16. Because the flow is caused by air pressure acting evenly on the entire surface of the milk in the tank, the flow is very smooth and the standpipe and conduits are completely filled, thus preventing aeration and agitation which would adversely affect the flavor of the milk and would cause it to spoil more rapidly. The rate of flow can be controlled either by the air pressure supplied, or by the effective flow area from the sump 32 into the standpipe (which, in turn, is controlled by the cut-off angle of the bottom end portion 68 of the standpipe), or both.

Because of the spherical shape of the tank 20 and the location of the sump 32 at the lowest point thereof, the tank can be thoroughly and completely drained except for a few drops at the bottom of the sump. Furthermore, the flow is continuous and smooth until the level of the milk reaches the upper edge of the cut-off 68 on the standpipe, almost at the bottom of the sump. At this point the air pressure is shut off inasmuch as the tank is completely drained.

When the transfer operation has been completed, the various conduits and fittings can be removed and readily cleaned and sterilized, and the cover 26 of the tank can be removed so that the tank and the cover itself can be thoroughly washed and cleaned. It is not necessary to remove the tank from the cart inasmuch as it can be completely washed and inspected while in place. Because of the spherical configuration of the tank, there are no creases or corners which could catch bacteria, and the washing and cleaning operation are greatly simplified.

Method

The dairy milk transfer method of this invention contemplates two basic steps. The first step is the sealed pumping of milk from a plurality of dairy cows into a portable sealed container. The second step is the subsequent sealed pumping of the milk from the sealed container into the milk storage tank. It will be seen that this method differs substantially from the bucket method of milking because of the substitution of sealed pumping transfer of the milk from the portable tank into the storage tank in order to prevent contamination. The method also differs substantially from the pipe-line method of transfer which contemplates substantially direct flow from the cow to the milk storage tank. By performing the transfer in two distinct steps all of the advantages of the present invention are provided and the disadvantages of turbulation, aeration and the substantial difficulty of cleaning of pipe-line systems are all avoided.

It will be understood, of course, that in ordinary practice the method of the present invention also involves an intermediate step in which the filled, sealed container is transported from the milking barn to the milk shed adjacent the milk storage tank.

While the apparatus which has been described in detail provides particularly efficient means for accomplishing the method of the present invention, this method is not necessarily limited to this particular apparatus.

In addition to the over-all transfer method the present invention provides an improved method for sanitary pumping of fluid milk or other liquids. This pumping method is performed in two steps, the first being the exertion of a gas pressure greater than atmospheric on the surface of a supply of confined milk. The second step is the simultaneous exposing of a portion of the milk to atmospheric pressure in a relatively small confined passage so that the milk will flow from the supply through the passage.

While the pumping method may be efficiently performed by the particular standpipe apparatus described, it will be understood that other types of apparatus could be utilized, and, consequently, the method is not limited to any particular apparatus.

Conclusion

From the foregoing description it will be seen that the present invention provides improved apparatus and an improved method for completely sealed transfer of milk from dairy cows to a milk storage tank thhrough the use of an intervening portable transfer tank which acts as a vacuum tank in connection with any type of milking machine and also acts as a holding tank for temporarily holding milk received from a number of dairy cows. In addition to the over-all combination of elements and the over-all transfer method involved, the invention contemplates a number of other improvements which all coact to provide a much more efficient and much more sanitary means and method for transferring fluid milk. Notable among these other improvements is the novel pump apparatus and pumping method which permit efficient pumping of liquid without contact with any moving pump impellers or vanes and without any agitation or aeration.

Variations and modifications may be effected without departing from the scope of the novel concepts of the present invention.

We claim:

1. A dairy milk receiver device for receiving milk from dairy cows comprising a sealed milk receiving tank, at least one inlet in fluid discharging communication with said tank adjacent the top portion thereof, a substantially vertical standpipe disposed in said tank spaced from the walls thereof and having a lower end adjacent a low point in the tank, and said standpipe having a milk conducting outer surface in near proximity with the discharge of said inlet, whereby milk discharged into said tank through said inlet flows against said milk conducting outer surface of said standpipe and down said surface into the tank without splashing.

2. A dairy milk receiver device according to claim 1 including a manifold fitting secured at the top of said tank and having a generally tubular body communicating with the interior of said tank and with its axle substantially vertical, said inlet being formed by a plurality of milk inlet pipes formed at right angles to said manifold fitting and communicating with the interior of said fitting, and said standpipe having an upper end portion disposed in spaced relation in said fitting with said milk conducting outer surface in near proximity with the discharge of said inlet pipes, whereby milk discharged through said milk inlet pipes flows against said upper end portion of said standpipe and down the milk conducting outer surface of the tank without splashing.

3. A dairy milk transfer device comprising a sealed milk receiving tank capable of holding milk from a substantial number of dairy cows, at least one tank inlet in fluid discharging communication with said tank adjacent the top portion thereof, sealed milking means for taking milk from a plurality of cows and for discharging milk into said tank through said tank inlet, a substantially vertical standpipe disposed in said tank spaced from the walls thereof, said standpipe having an upper outlet port outside the tank and a lower inlet port adjacent a low point in the tank, said standpipe also having a milk conducting outer surface in near proximity with the discharge of said tank inlet, whereby milk discharged to said tank through said tank inlet flows against said milk conducting outer surface of said standpipe and down said surface into the tank without splashing, and means for imposing a pressure on the surface of the milk in the tank to cause the milk to flow in the inlet port of the standpipe, through the interior of the standpipe and out the outlet port.

4. A dairy milk transfer device according to claim 3 for sealed transfer of milk from dairy cows to a milk storage tank, said receiving tank being of spherical configuration, a sump secured to said receiving tank below the lowest point thereof and communicating with the interior of said receiving tank, said standpipe having its lower end portion disposed in spaced relation in said sump, said standpipe inlet port being formed at its bottom end communicating with the bottom of said sump, first sealed conduit means adapted to be connected to carry milk from said milking means to said tank inlet, vacuum means for actuating said milking means and for creating a partial vacuum in said receiving tank whereby the milk flows from the milking means through said first conduit means against said milk conducting outer surface of said standpipe and down said milk conducting outer surface into the receiving tank without splashing, means for cutting off said vacuum means from said receiving tank, and second sealed conduit means connecting the outer portion of said standpipe with the milk storage tank to carry the milk to the milk storage tank when said means for imposing pressure are actuated.

5. A dairy milk transfer device according to claim 3 for sealed transfer of milk from a plurality of dairy cows to a milk storage tank including a milk inlet fitting secured at the top of said receiving tank and having a generally tubular body communicating with the interior of said receiving tank and with its axis substantially vertical, said tank inlet being formed by a plurality of milk inlet pipes formed at right angles on said milk inlet fitting and communicating with the interior of said fitting, a sump formed below the lowest point of said receiving tank and communicating with the interior of said tank, said standpipe extending into said receiving tank in spaced relation through said milk inlet fitting and having its lower end portion disposed in spaced relation in said sump, said standpipe outlet port being disposed above said milk inlet fitting and said standpipe inlet port being disposed adjacent the bottom of said sump, means for sealing the space between said standpipe and said milk inlet fitting above said milk inlet pipes, said milking means being adapted for conducting milk to said milk inlet pipes to discharge the milk against the milk conducting surface of said standpipe whereby the milk flows down the milk conducting surface into said receiving tank without splashing, means for closing the outlet port of said standpipe when said milking means are in operation, conduit means connecting the outlet port of said standpipe to the milk storage tank when said milking means are not in operation, means for sealing said milk inlet pipes when said milking means are not in operation, said means for imposing pressure being actuated when said milking means are not in operation to cause the milk to flow in the inlet port of the standpipe, through the interior of the standpipe and out the outlet port through the sealed conduit means into the milk storage tank.

References Cited in the file of this patent

UNITED STATES PATENTS

| | | |
|---|---|---|
| 178,213 | Voute | May 30, 1876 |
| 1,070,246 | Gray et al. | Aug. 12, 1913 |
| 1,616,017 | Williams | Feb. 1, 1927 |
| 1,910,830 | Hapgood | May 23, 1933 |
| 2,254,092 | Schmitt et al. | Aug. 26, 1941 |
| 2,608,951 | Kingston | Sept. 2, 1952 |
| 2,677,348 | Domingo | May 4, 1954 |
| 2,678,627 | Kingston | May 18, 1954 |
| 2,712,298 | Bajema | July 5, 1955 |
| 2,851,989 | Rawson | Sept. 16, 1958 |
| 2,853,050 | Golay | Sept. 23, 1958 |

FOREIGN PATENTS

| | | |
|---|---|---|
| 110,667 | Australia | May 22, 1940 |

UNITED STATES PATENT OFFICE
CERTIFICATE OF CORRECTION

Patent No. 2,982,247                          May 2, 1961

Anthony A. Varese et al.

It is hereby certified that error appears in the above numbered patent requiring correction and that the said Letters Patent should read as corrected below.

Column 9, line 31, for "axle" read -- axis --.

Signed and sealed this 10th day of October 1961.

(SEAL)
Attest:

ERNEST W. SWIDER
Attesting Officer

DAVID L. LADD
Commissioner of Patents

USCOMM-DC